(12) United States Patent
Smith et al.

(10) Patent No.: US 8,724,245 B1
(45) Date of Patent: May 13, 2014

(54) DISK DRIVE EMPLOYING OVERLAPPING SERVO ZONES TO FACILITATE SERVO ZONE CROSSING

(75) Inventors: Steven C. Smith, San Jose, CA (US); Charles A. Park, Aromas, CA (US); Siri S. Weerasooriya, Campbell, CA (US); Jenghung Chen, Cupertino, CA (US); Guoxiao Guo, Irvine, CA (US); Wei Guo, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 23 days.

(21) Appl. No.: 13/529,861

(22) Filed: Jun. 21, 2012

(51) Int. Cl.
*G11B 5/09* (2006.01)

(52) U.S. Cl.
USPC .............. 360/51; 360/49; 360/75; 360/77.08; 360/78.14

(58) Field of Classification Search
None
See application file for complete search history.

(56) References Cited

U.S. PATENT DOCUMENTS

| | | | |
|---|---|---|---|
| 5,208,556 A | 5/1993 | Wilson | |
| 5,384,671 A | 1/1995 | Fisher | |
| 5,418,659 A | 5/1995 | Shergill | |
| 5,739,994 A | 4/1998 | Ottesen et al. | |
| 5,796,535 A | 8/1998 | Tuttle et al. | |
| 5,861,766 A | 1/1999 | Baumer et al. | |
| 5,956,196 A | 9/1999 | Hull et al. | |
| 6,028,727 A | 2/2000 | Vishakhadatta et al. | |
| 6,084,738 A | 7/2000 | Duffy | |
| 6,118,604 A | 9/2000 | Duffy | |
| 6,178,056 B1 | 1/2001 | Cloke et al. | |
| 6,262,857 B1 | 7/2001 | Hull et al. | |
| 6,388,829 B1 | 5/2002 | Nazarian | |
| 6,411,452 B1 | 6/2002 | Cloke | |
| 6,441,981 B1 | 8/2002 | Cloke et al. | |
| 6,519,104 B1 | 2/2003 | Cloke et al. | |
| 6,628,171 B1 | 9/2003 | Chou et al. | |
| 6,873,483 B2 | 3/2005 | Hetzler et al. | |
| 6,943,978 B1 | 9/2005 | Lee | |
| 6,992,856 B2 | 1/2006 | Ehrlich | |
| 7,006,316 B1 | 2/2006 | Sargenti, Jr. et al. | |
| 7,012,773 B2 | 3/2006 | Ashikaga et al. | |
| 7,035,026 B2 | 4/2006 | Codilian et al. | |
| 7,054,083 B2 | 5/2006 | Ehrlich | |
| 7,072,128 B2 | 7/2006 | Ehrlich | |
| 7,075,742 B2 | 7/2006 | Ehrlich | |
| 7,092,177 B2 | 8/2006 | Ehrlich | |
| 7,333,286 B2 | 2/2008 | Jung et al. | |
| 7,388,817 B2 | 6/2008 | Tsunoda | |
| 7,405,893 B2 | 7/2008 | Bi et al. | |
| 7,453,661 B1 | 11/2008 | Jang et al. | |
| 7,505,223 B1 | 3/2009 | McCornack | |
| 7,535,805 B2 | 5/2009 | Hsin | |
| 7,715,138 B1 | 5/2010 | Kupferman | |
| 7,729,074 B2 | 6/2010 | Venkataramani et al. | |

(Continued)

*Primary Examiner* — Muhammad N Edun (57) ABSTRACT

A disk drive is disclosed comprising a head actuated over a disk, the disk comprising a plurality of servo sectors defining a plurality of servo tracks, wherein the servo tracks form a plurality of servo zones. A servo data rate of servo sectors in a first servo zone is different than a servo data rate of servo sectors in a second servo zone. A boundary of a first servo zone overlaps with a boundary of a second servo zone over a transition zone. The servo sectors of the first servo zone are interleaved with the servo sectors of the second servo zone within the transition zone. At least one servo parameter is adjusted when the head is over the transition zone in order to transition between the first servo zone and the second servo zone.

22 Claims, 5 Drawing Sheets

(56) References Cited

U.S. PATENT DOCUMENTS

| | | |
|---|---|---|
| 7,813,065 B2 | 10/2010 | Annampedu et al. |
| 7,843,662 B1 | 11/2010 | Weerasooriya et al. |
| 7,929,238 B1 | 4/2011 | Vasquez |
| 8,022,774 B2 | 9/2011 | Ueno et al. |
| 8,031,429 B2 * | 10/2011 | Gerasimov ............. 360/78.09 |
| 8,116,023 B1 | 2/2012 | Kupferman |
| 8,120,868 B2 * | 2/2012 | Bi et al. .................. 360/48 |
| 8,213,106 B1 | 7/2012 | Guo et al. |
| 8,576,506 B1 | 11/2013 | Wang et al. |
| 2003/0086196 A1 | 5/2003 | Morris et al. |
| 2004/0160696 A1 | 8/2004 | Meyer |
| 2007/0047132 A1 | 3/2007 | Sado et al. |
| 2007/0064325 A1 | 3/2007 | Bi et al. |
| 2007/0081268 A1 | 4/2007 | Jung et al. |
| 2007/0211367 A1 | 9/2007 | Lau et al. |
| 2007/0211369 A1 | 9/2007 | Yang et al. |
| 2008/0002279 A1 | 1/2008 | Kouhara et al. |
| 2008/0239556 A1 | 10/2008 | Wiseman et al. |
| 2009/0086357 A1 | 4/2009 | Ehrlich |

* cited by examiner

DISK DRIVE EMPLOYING OVERLAPPING SERVO ZONES TO FACILITATE SERVO ZONE CROSSING

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the user data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the user data rate is constant across a zone, and increased from the inner diameter zones to the outer diameter zones. This is illustrated in FIG. 1A, which shows a prior art disk format 2 comprising a number of data tracks 4, wherein the data tracks are banded together in this example to form three physical zones from the inner diameter of the disk (Z0) to the outer diameter of the disk (Z2).

Figure 1A:
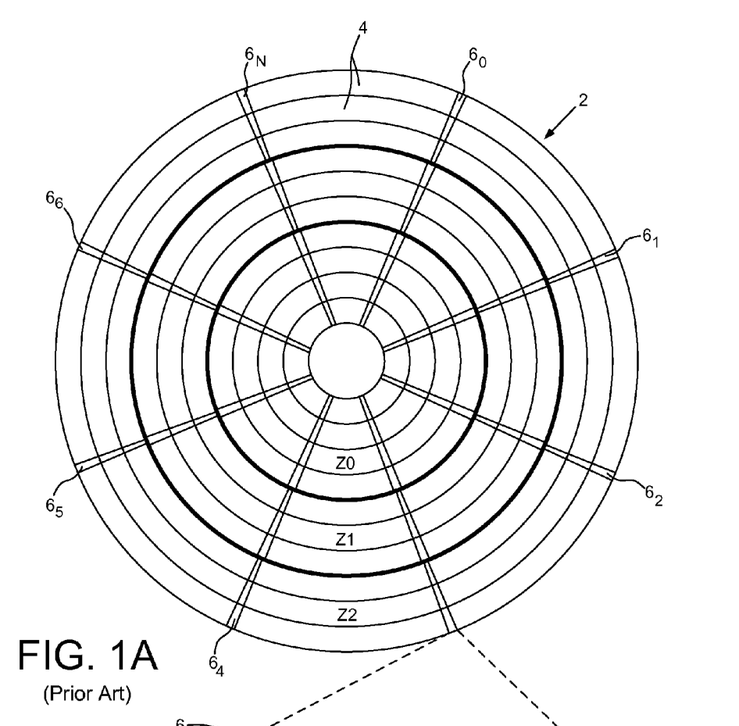
FIG. 1A shows a prior art disk format comprising a plurality of servo zones defined by servo sectors recorded at varying data rates.

The prior art disk format of FIG. 1A also comprises a number of servo sectors $6_0$-$6_N$ recorded around the circumference of the disk 2 that define a plurality of servo tracks, wherein the data tracks 4 are defined relative to the servo tracks. Each servo sector 6, may comprise a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, may further comprise groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

Figure 1B:
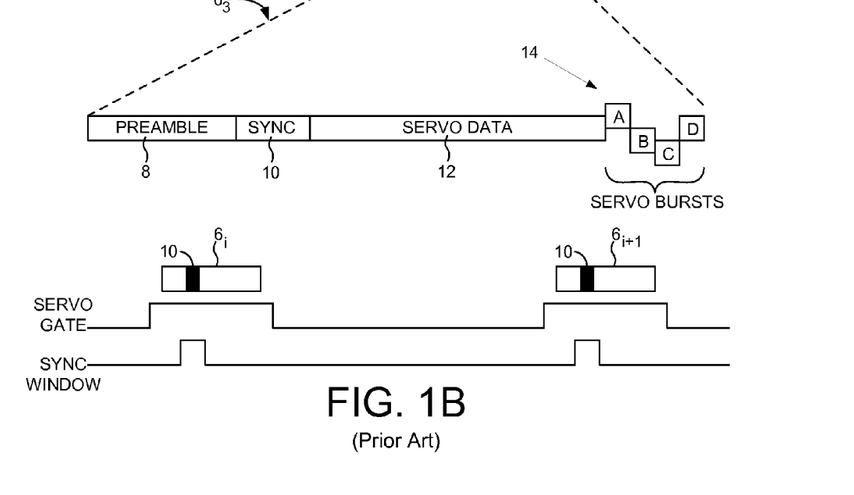
FIG. 1B shows prior art servo timing signals, including a servo gate and a sync window.

To facilitate demodulating the servo sectors $6_0$-$6_N$, a timing control loop generates a disk locked clock synchronized to the data rate of the servo sectors $6_0$-$6_N$. The disk locked clock generates suitable timing information, such as a servo gate that times the circumferential location of the servo sectors $6_0$-$6_N$, and a sync window that times the circumferential location of the sync marks 10 within the servo sectors $6_0$-$6_N$ as shown in FIG. 1B.

In the embodiment of FIG. 1A, the data rate of the servo sectors $6_0$-$6_N$ changes in each physical zone similar to the data sectors in order to improve format efficiency. However, a zoned servo sector format may be problematic when a seek operation crosses a servo zone boundary. For example, if the location of a servo zone boundary is estimated incorrectly (too early or too late), the disk drive can lose synchronization to the servo sectors due to incorrect adjustments to servo control parameters, such as an incorrect adjustment to the servo gate, or an incorrect adjustment to the sync window, or an incorrect adjustment to the timing control loop that synchronizes the disk locked clock to the data rate of the servo sectors.

DETAILED DESCRIPTION

Figure 2A:
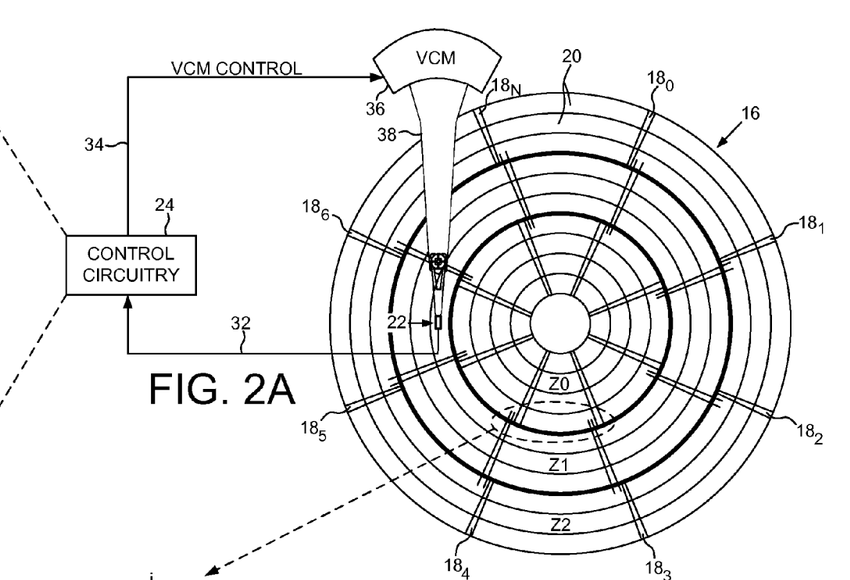
FIGS. 2A and 2B show a disk drive according to an embodiment of the present invention comprising a head actuated over a disk, the disk comprising overlapping, zoned servo sectors.
Figure 2B:
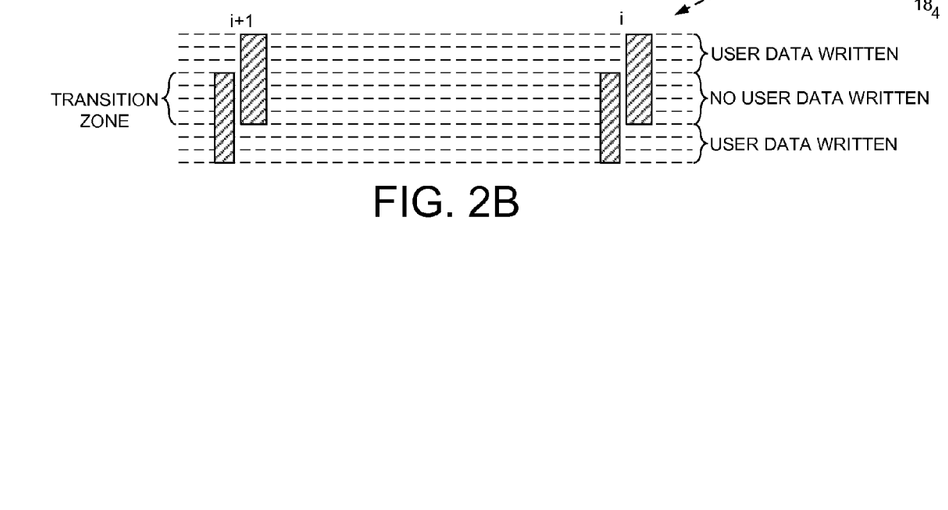
Figure 2C:
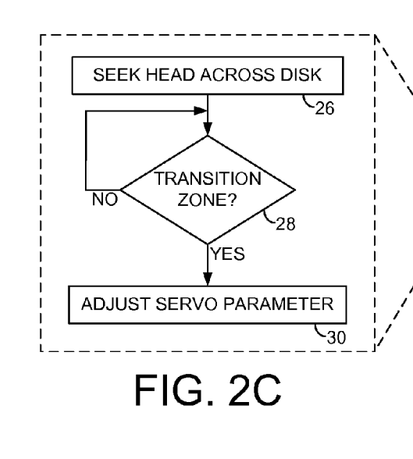
FIG. 2C is a flow diagram according to an embodiment of the present invention wherein when the head transitions between servo zones, a servo parameter is adjusted.

FIG. 2A shows a disk drive according to an embodiment of the present invention comprising a disk 16 comprising a plurality of servo sectors $18_0$-$18_N$ defining a plurality of servo tracks 20. The servo tracks 20 form a plurality of servo zones (e.g., Z0-Z2) wherein a servo data rate of servo sectors in a first servo zone is different than a servo data rate of servo sectors in a second servo zone. Referring to FIG. 2B, a boundary of a first servo zone overlaps with a boundary of a second servo zone over a transition zone, and the servo sectors of the first servo zone are interleaved with the servo sectors of the second servo zone within the transition zone. A head 22 is actuated radially over the disk 16, and control circuitry 24 is operable to execute the flow diagram of FIG. 2C, wherein when seeking the head 22 across the disk 16 (block 26), at least one servo parameter is adjusted (block 30) when the head is over the transition zone (block 28) in order to transition between the first servo zone and the second servo zone.

In the embodiment of FIG. 2A the control circuitry 24 processes a read signal 32 emanating from the head 22 to demodulate the servo sectors $18_0$-$18_N$ and generate a position error signal (PES) representing an error between the actual position of the head and a target position relative to a target track. The control circuitry 24 filters the PES using suitable compensation filters to generate a control signal 34 applied to a voice coil motor (VCM) 36 which rotates an actuator arm 38 about a pivot, thereby actuating the head 22 radially over the disk 16 in a direction that reduces the PES. The servo sectors $18_0$-$18_N$ may comprise any suitable position information, such as a track and wedge address for coarse positioning and servo bursts for fine positioning as described above with reference to FIG. 1A. The servo bursts may comprise any suitable pattern, such as an amplitude based servo pattern as shown in FIG. 1A, or a suitable phase based servo pattern.

Varying the servo data rate across the servo zones (by increasing the servo data rate toward the outer diameter servo zones) increases the capacity of the disk 16 by reducing the area consumed by the servo sectors. To facilitate a servo zone crossing during a seek operation, the servo sectors are recorded so they overlap by a controlled amount at the servo zone boundaries as illustrated in FIG. 2B. In one embodiment, the overlapping servo sectors are interleaved within the transition zone such that the servo sectors of each servo zone pass under the head 22 in an alternating sequence. This is accomplished by recording the servo sectors with a circumferential offset between servo zones as illustrated in FIG. 2B. While the head 22 is within the transition zone during a seek operation, at least one servo parameter is adjusted in order to transition between the servo zones.

Figure 2D:
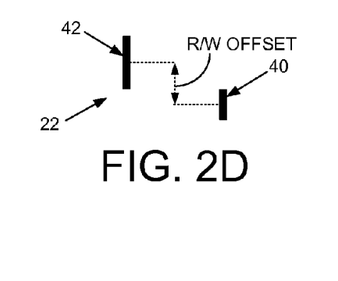
FIG. 2D shows an embodiment of the present invention wherein the head comprises a read element and a write element separated by a radial offset, wherein the transition zone of the servo sectors is at least as wide as the radial offset.

In one embodiment, user data is written in the data tracks outside the transition zones, whereas user data is not written in the data tracks within the transition zone. In this manner, the format complexity of accounting for twice the number of servo sectors within the transition zone is avoided. In one embodiment illustrated in FIG. 2D, the head 22 comprises a read element 40 and a write element 42 separated by a radial offset, and the transition zone shown in FIG. 2B is at least as wide as the radial offset between the read element and write element. This embodiment may help ensure both the read element 40 and the write element 42 are within the same servo zone when performing an access operation (write or read) of a data track.

In one embodiment, the data tracks are also banded together to define data zones, wherein the user data rate is increased toward the outer diameter zones in order to improve the format efficiency. The number of data zones may equal the number of servo zones, or the number of data zones may be less than or greater than the number of servo zones. The boundaries of the data zones may align with the boundary of a servo zone, or the data zone boundaries may be located at radial locations different from the boundaries of the servo zones.

Figure 3A:
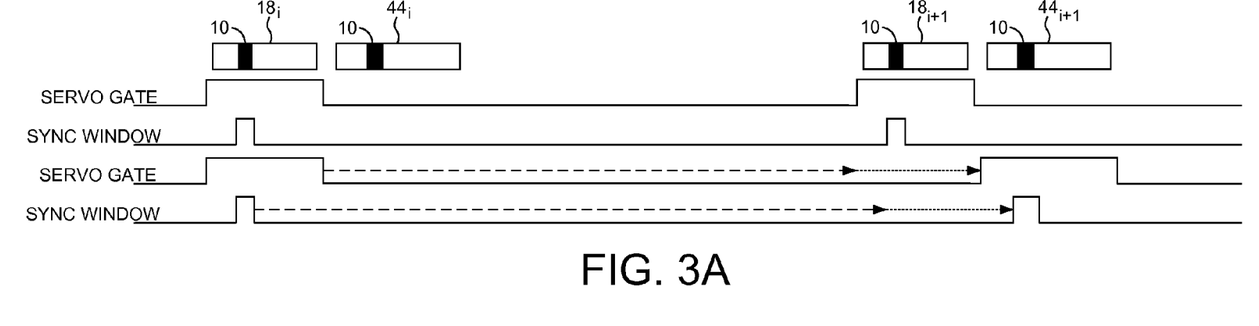
FIG. 3A illustrates the adjustment of servo timing signals when transitioning between servo zones according to an embodiment of the present invention.

Any suitable servo parameter may be adjusted when the control circuitry 24 transitions between servo zones while the head 22 is within the transition zone. FIG. 3A illustrates an embodiment of the present invention wherein a servo gate times a circumferential location of the servo sectors and a sync window times a circumferential location of the sync mark 10 within a servo sector. In the example of FIG. 3A, the head 22 is seeking from servo zone Z2 to servo zone Z1 in FIG. 2A. When reading the servo sectors in servo zone Z2, the servo gate and sync mark window are opened relative to servo sectors $18_i$ and $18_{i+1}$. When a servo zone transition is executed, the servo gate and sync window are adjusted so as to time the circumferential location of the servo sector $44_{i+1}$ in servo zone Z1. In another embodiment, the servo parameter adjusted during a servo zone transition comprises a center frequency for a timing control loop that synchronizes a disk locked clock to the data rate of the servo sectors.

Figure 3B:
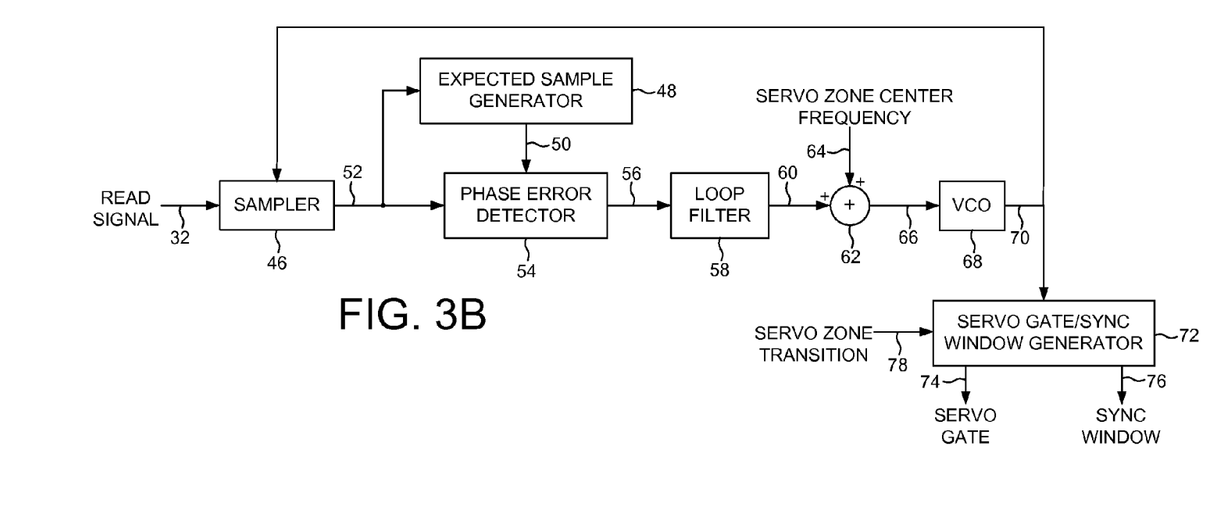
FIG. 3B shows a timing control loop for generating the servo timing signals according to an embodiment of the present invention.

Any suitable timing control loop may be employed in the embodiments of the present invention. FIG. 3B shows an example timing control loop comprising a phase locked loop (PLL) for synchronizing a sampling device 46 to the data rate of the read signal 32. An expected sample generator 48 generates expected samples 50 corresponding to a target response (e.g., a suitable partial response) relative to the read signal samples 52. A phase detector 54 generates a phase error 56 in response to the expected samples 50 and the read signal samples 52. The phase error 56 is filtered with a suitable compensation filter 58 to generate a control signal 60. The control signal 60 is added 62 to a center frequency 64 to generate a frequency control signal 66 for a voltage controlled oscillator (VCO) 68. The output of the VCO 68 is a disk locked clock 70 that adjusts the frequency of the sampling device 46 until the read signal 32 is sampled synchronously. The disk locked clock 70 is also used to clock a signal generator 72 that generates the servo gate 74 and sync window 76. In another embodiment, the timing control loop may comprise a fixed rate sampling clock with an interpolator for generating the synchronous sample values and for timing the servo gate and sync window.

When transitioning between servo zones, the center frequency 64 of the timing control loop is adjusted to substantially match the servo data rate of the next servo zone. A control signal 78 also makes a suitable adjustment to the signal generator 72 in order to make the corresponding adjustment to the servo gate 74 and sync window 76. For example, the control signal 78 may switch to a fixed rate clock for timing the servo gate and sync window during the servo zone transition, or the control signal 78 may make a suitable adjustment to counters within the signal generator 72 in order to account for the transient in the disk locked clock 70 caused by adjusting the center frequency 64.

Figure 4A:
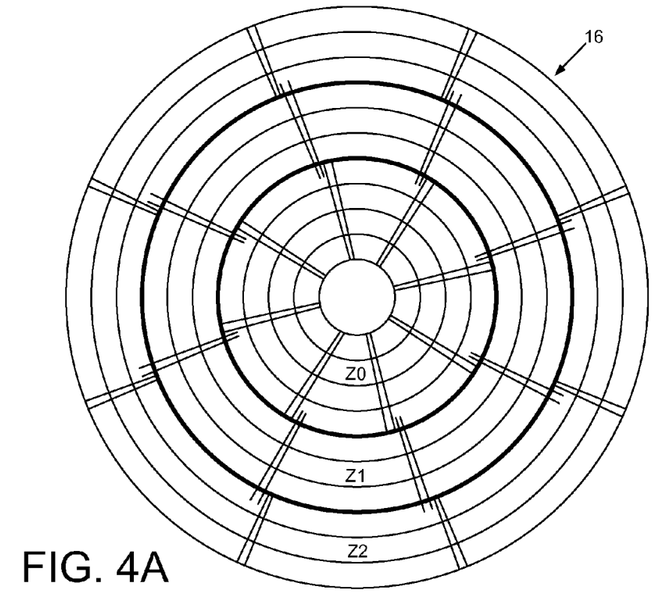
FIG. 4A shows an alternative embodiment of the present invention for recording the overlapping, zoned servo sectors.
Figure 4B:
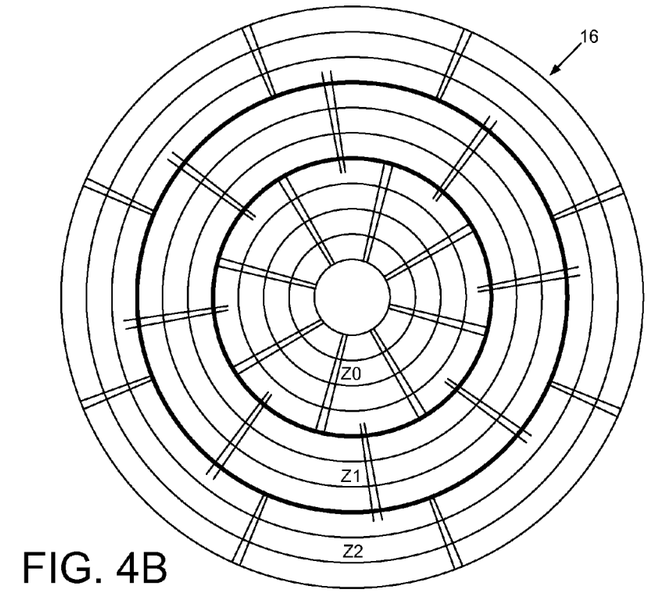
FIG. 4B shows an embodiment of the present invention wherein the overlapping, zoned servo sectors may be staggered circumferentially across the servo zones.

The disk 16 in FIG. 2A may comprise any suitable number of servo zones, and the servo sectors of the servo zones may overlap in any suitable manner. In the example of FIG. 2A, there are three servo zones wherein the servo sectors of the middle servo zone (zone Z1) extend across the boundaries of the adjacent servo zones (zone Z0 and Z2) by offsetting circumferentially the servo sectors of zone Z1. In an alternative embodiment shown in FIG. 4A, the servo sectors of each servo zone may be offset circumferentially so that the servo sectors form a stair step pattern. In other embodiments, the servo sectors in each servo zone may be staggered circumferentially around the disk 16 as illustrated in FIG. 4B. In yet other embodiments, the number of servo sectors may vary within each servo zone so that the servo sample rate varies within each servo zone.

The overlapping, interleaved servo sectors within a transition zone may be separated by any suitable gap. In one embodiment, the gap between the interleaved servo sectors may be of sufficient size to store additional servo related information, such as storing repeatable runout (RRO) information that may be recorded to the disk 16 after writing the servo sectors to the disk.

Figures 5A, 5B:
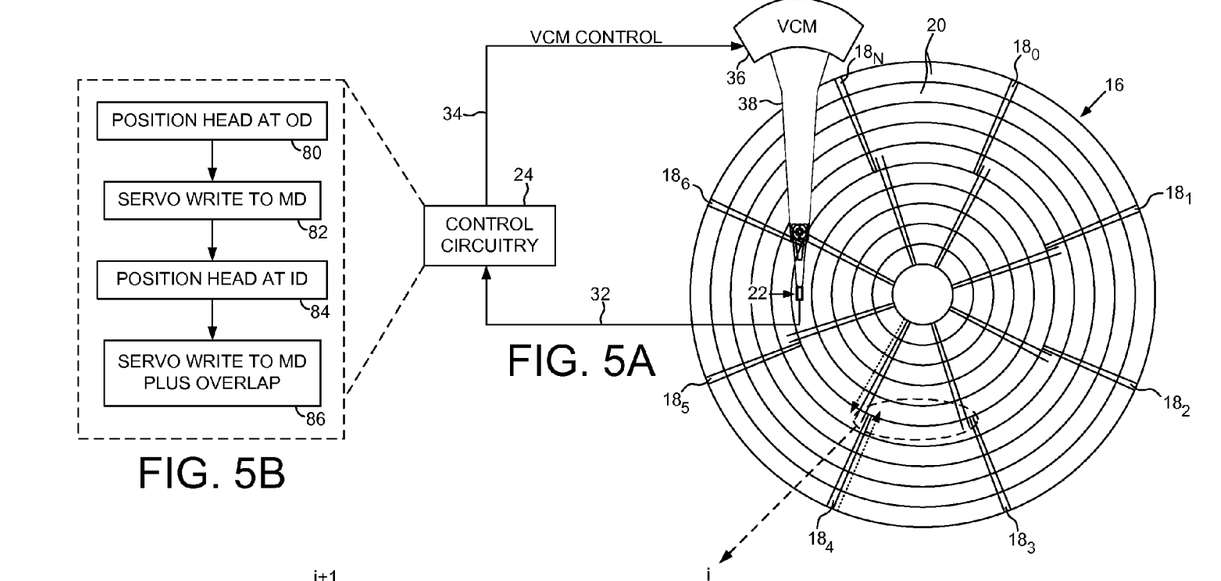
FIG. 5A shows a disk drive according to an embodiment of the present invention comprising a head actuated over a disk that is self-servo written with servo sectors.
FIG. 5B is a flow diagram according to an embodiment of the present invention wherein the servo sectors are written from the outer diameter toward the middle diameter, and from the inner diameter toward the middle diameter with a controlled overlap near the middle diameter.
Figure 5C:
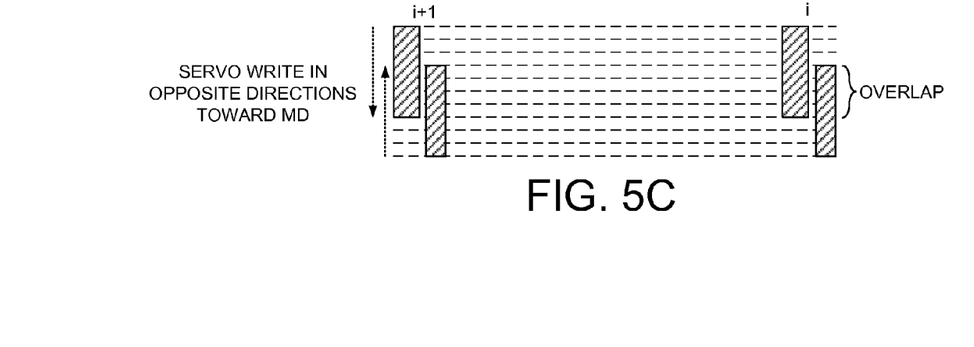
FIG. 5C illustrates the controlled overlap of the servo sectors near the middle diameter of the disk according to an embodiment of the present invention.

FIG. 5A shows a disk drive according to an embodiment of the present invention wherein the control circuitry 24 is operable to execute the flow diagram of FIG. 5B, wherein after positioning the head at the outer diameter (OD) of the disk 16 (block 80), first servo sectors are written in a first radial direction to define servo tracks from a first diameter of the disk to substantially a middle diameter of the disk (block 82). The head is then positioned at the inner diameter (ID) of the disk (block 84), and second servo sectors are written in a second radial direction opposite the first radial direction to define servo tracks from a second diameter of the disk toward the middle diameter of the disk (block 86). As shown in FIG. 5C, a boundary of the first servo sectors overlaps with a boundary of the second servo sectors over a transition zone, and the first servo sectors are interleaved with the second servo sectors within the transition zone.

In one embodiment, writing the servo sectors in opposite directions toward the MD of the disk 16 helps prevent the write pole of the write element 42 from swinging out and overwriting the servo sectors of a previously written servo track. Overlapping the servo sectors within the transition zone as shown in FIG. 5C helps ensure the control circuitry 24 can seek head 22 seamlessly over the transition zone without losing synchronization to the servo sectors. In one embodiment, a servo data rate of the first servo sectors written from the OD to MD is different than a servo data rate of the second servo sectors written from the ID to MD. That is, the OD and MD servo sectors define servo zones having different servo data rates as described above. In an alternative embodiment, a servo data rate of the first servo sectors written from the OD to MD is substantially the same as a servo data rate of the second servo sectors written from the ID to the MD. In the latter embodiment, the servo gate and sync window are adjusted without adjusting the center frequency of the timing control loop when transitioning between the first and second servo sectors.

In one embodiment, the write element 42 may be substantially wider than the read element 40 (FIG. 2D); for example, in a shingled disk drive where the servo and data tracks may be written in an overlapping manner. When the write element 42 is wider than the read element 40, self-servo writing typically requires at least part of the servo sectors to be written over multiple disk revolutions so that the servo data (e.g., servo bursts) can be suitably trimmed. In this embodiment, the servo sectors are written so that the transition zone at the MD of the disk (FIG. 5C) is at least as wide as the width of the write element 42 to ensure that a full servo sector may be read (in either the first or second set).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk comprising a plurality of servo sectors defining a plurality of servo tracks, wherein:
the servo tracks form a plurality of servo zones;
a servo data rate of servo sectors in a first servo zone is different than a servo data rate of servo sectors in a second servo zone;
a boundary of a first servo zone overlaps with a boundary of a second servo zone over a transition zone; and
the servo sectors of the first servo zone are interleaved with the servo sectors of the second servo zone within the transition zone;
a head actuated radially over the disk; and
control circuitry operable to adjust at least one servo parameter when the head is over the transition zone in order to transition between the first servo zone and the second servo zone.

2. The disk drive as recited in claim 1, wherein:
the head comprises a read element and a write element separated by a radial offset; and
the transition zone is at least as wide as the radial offset.

3. The disk drive as recited in claim 1, wherein the servo sectors of the first servo zone are offset circumferentially from the servo sectors of the second servo zone.

4. The disk drive as recited in claim 1, wherein the servo parameter comprises a servo gate that times a circumferential location of the servo sectors.

5. The disk drive as recited in claim 1, wherein the servo parameter comprises a sync window that times a circumferential location of a sync mark within the servo sectors.

6. The disk drive as recited in claim 1, wherein the servo parameter comprises a center frequency for a timing control loop that synchronizes a disk locked clock to the servo data rate of the servo sectors.

7. The disk drive as recited in claim 1, wherein the control circuitry is further operable to:
define a plurality of data tracks on the disk relative to the servo tracks;
write user data to data tracks outside the transition zone; and
not write user data within at least part of the transition zone.

8. The disk drive as recited in claim 1, wherein:
the head comprises a read element and a write element substantially wider than the read element; and
the transition zone is at least as wide as the write element.

9. A disk drive comprising:
a disk;
a head actuated radially over the disk; and
control circuitry operable to:
write first servo sectors in a first radial direction to define servo tracks from a first diameter of the disk to substantially a middle diameter of the disk;
write second servo sectors in a second radial direction opposite the first radial direction to define servo tracks from a second diameter of the disk toward the middle diameter of the disk, wherein:
a boundary of the first servo sectors overlaps with a boundary of the second servo sectors over a transition zone; and
the first servo sectors are interleaved with the second servo sectors within the transition zone.

10. The disk drive as recited in claim 9, wherein a servo data rate of the first servo sectors is different than a servo data rate of the second servo sectors.

11. The disk drive as recited in claim 9, wherein a servo data rate of the first servo sectors is substantially the same as a servo data rate of the second servo sectors.

12. A method of operating a disk drive, the disk drive comprising a head actuated over a disk comprising a plurality of servo sectors defining a plurality of servo tracks, wherein:
- the servo tracks form a plurality of servo zones;
- a servo data rate of servo sectors in a first servo zone is different than a servo data rate of servo sectors in a second servo zone;
- a boundary of a first servo zone overlaps with a boundary of a second servo zone over a transition zone; and
- the servo sectors of the first servo zone are interleaved with the servo sectors of the second servo zone within the transition zone;
- the method comprising adjusting at least one servo parameter when the head is over the transition zone in order to transition between the first servo zone and the second servo zone.

13. The method as recited in claim 12, wherein:
- the head comprises a read element and a write element separated by a radial offset; and
- the transition zone is at least as wide as the radial offset.

14. The method as recited in claim 12, wherein the servo sectors of the first servo zone are offset circumferentially from the servo sectors of the second servo zone.

15. The method as recited in claim 12, wherein the servo parameter comprises a servo gate that times a circumferential location of the servo sectors.

16. The method as recited in claim 12, wherein the servo parameter comprises a sync window that times a circumferential location of a sync mark within the servo sectors.

17. The method as recited in claim 12, wherein the servo parameter comprises a center frequency for a timing control loop that synchronizes a disk locked clock to the servo data rate of the servo sectors.

18. The method as recited in claim 12, further comprising:
- defining a plurality of data tracks on the disk relative to the servo tracks;
- writing user data to data tracks outside the transition zone; and
- not writing user data within at least part of the transition zone.

19. A method of operating a disk drive, the disk drive comprising a head actuated over a disk, the method comprising:
- writing first servo sectors in a first radial direction to define servo tracks from a first diameter of the disk to substantially a middle diameter of the disk;
- writing second servo sectors in a second radial direction opposite the first radial direction to define servo tracks from a second diameter of the disk toward the middle diameter of the disk, wherein:
  - a boundary of the first servo sectors overlaps with a boundary of the second servo sectors over a transition zone; and
  - the first servo sectors are interleaved with the second servo sectors within the transition zone.

20. The method as recited in claim 19, wherein a servo data rate of the first servo sectors is different than a servo data rate of the second servo sectors.

21. The method as recited in claim 19, wherein a servo data rate of the first servo sectors is substantially the same as a servo data rate of the second servo sectors.

22. The method as recited in claim 19, wherein:
- the head comprises a read element and a write element substantially wider than the read element; and
- the transition zone is at least as wide as the write element.

* * * * *